United States Patent
Tabrizi et al.

(10) Patent No.: US 9,690,655 B2
(45) Date of Patent: Jun. 27, 2017

(54) METHOD AND SYSTEM FOR IMPROVING FLASH STORAGE UTILIZATION BY PREDICTING BAD M-PAGES

(71) Applicant: EMC Corporation, Santa Clara, CA (US)

(72) Inventors: Haleh Tabrizi, Santa Clara, CA (US); Rajiv Agarwal, Santa Clara, CA (US); Jeffrey Paul Ferreira, Santa Clara, CA (US); Jeffrey S. Bonwick, Santa Clara, CA (US); Michael W. Shapiro, Menlo Park, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 172 days.

(21) Appl. No.: 14/501,917

(22) Filed: Sep. 30, 2014

(65) Prior Publication Data

US 2016/0092304 A1 Mar. 31, 2016

(51) Int. Cl.
*G06F 11/00* (2006.01)
*G06F 11/10* (2006.01)
(Continued)

(52) U.S. Cl.
CPC .......... *G06F 11/1072* (2013.01); *G06F 3/064* (2013.01); *G06F 3/0619* (2013.01);
(Continued)

(58) Field of Classification Search
USPC ........................................................ 714/6.1
See application file for complete search history.

(56) References Cited

U.S. PATENT DOCUMENTS 6,016,275 A 1/2000 Han
8,189,379 B2 * 5/2012 Camp ................ G11C 16/3418
365/185.02

(Continued)

FOREIGN PATENT DOCUMENTS

JP 2003058432 A 2/2003
JP 2009205578 A 9/2009
(Continued)

OTHER PUBLICATIONS

Extended European Search Report in counterpart European Application No. 15 18 7372.6 issued Feb. 26, 2016 (9 pages).
(Continued)

*Primary Examiner* — Amine Riad
(74) *Attorney, Agent, or Firm* — Chamberlain, Hrdlicka

(57) ABSTRACT

A method for managing persistent storage. The method includes selecting a page for a proactive read request, where the page is located in the persistent storage. The method further includes issuing the proactive read request to the page, receiving, in response to the proactive read request, a bit error value (BEV) for data stored on the page, obtaining a BEV threshold (T) for the page, wherein T is determined using a program/erase cycle value associated with the page and a retention time of the data stored on the page, making a first determination that the BEV is greater than T, based on the first determination: identifying an m-page, where the m-page is a set of pages and the page is in the set of pages, and setting the m-page as non-allocatable for future operations.

18 Claims, 9 Drawing Sheets

(51) Int. Cl.
  *G06F 11/07* (2006.01)
  *G06F 3/06* (2006.01)
  *G06F 11/22* (2006.01)

(52) U.S. Cl.
  CPC .......... *G06F 3/0653* (2013.01); *G06F 3/0679* (2013.01); *G06F 3/0688* (2013.01); *G06F 11/076* (2013.01); *G06F 11/0727* (2013.01); *G06F 11/108* (2013.01); *G06F 11/2221* (2013.01); *G06F 2212/403* (2013.01)

(56) References Cited

U.S. PATENT DOCUMENTS

| | | | |
|---|---|---|---|
| 8,321,025 B2* | 11/2012 | Bedenbaugh | A61N 1/0529 607/45 |
| 8,321,625 B2* | 11/2012 | Weingarten | G06F 12/0246 711/103 |
| 8,843,698 B2* | 9/2014 | Weingarten | G06F 12/0246 365/185.29 |
| 9,058,281 B2* | 6/2015 | Goss | G06F 12/0871 |
| 9,263,158 B2* | 2/2016 | Prohofsky | G06F 11/1048 |
| 9,496,043 B1* | 11/2016 | Camp | G11C 16/26 |
| 2003/0033567 A1 | 2/2003 | Tamura et al. | |
| 2010/0122148 A1 | 5/2010 | Flynn et al. | |
| 2010/0332894 A1 | 12/2010 | Bowers et al. | |
| 2011/0173484 A1 | 7/2011 | Schuette et al. | |
| 2012/0311381 A1 | 12/2012 | Porterfield | |
| 2013/0080691 A1* | 3/2013 | Weingarten | G06F 12/0246 711/103 |

FOREIGN PATENT DOCUMENTS

| | | |
|---|---|---|
| JP | 2010079486 A | 4/2010 |
| JP | 2011040146 A | 2/2011 |
| JP | 2014515537 A | 6/2014 |
| WO | 2009107268 A1 | 9/2009 |
| WO | 2010054410 A2 | 5/2010 |
| WO | 2012/058328 A1 | 5/2012 |
| WO | 2012166726 A2 | 12/2012 |
| WO | 2013/100958 A1 | 7/2013 |

OTHER PUBLICATIONS

H. Choi, W. Liu, and W. Sung, "VLSI implementation of BCH error correction for multilevel cell nand flash memory," Very Large Scale Integration (VLSI) Systems, IEEE Transactions on, vol. 18, No. 5, pp. 843-847, 2010.

T.-H. Chen, Y.-Y. Hsiao, Y.-T. Hsing, and C.-W. Wu, "An adaptive-rate error correction scheme for NAND flash memory," in 2009 27th IEEE VLSI Test Symposium, 2009, pp. 53-58.

E. Gal and S. Toledo, "Algorithms and data structures for flash memories," ACM Computing Surveys (CSUR), vol. 37, No. 2, pp. 138-163, 2005.

M. Rosenblum and J. K. Ousterhout, "The design and implementation of a log-structured file system," ACM Transactions on Computer Systems (TOCS), vol. 10, No. 1, pp. 26-52, 1992.

C. Park, W. Cheon, J. Kang, K. Roh, W. Cho, and J.-S. Kim, "A reconfigurable FTL (flash translation layer) architecture for NAND flashbased applications," ACM Transactions on Embedded Computing Systems (TECS), vol. 7, No. 4, p. 38, 2008.

Y. Cai, G. Yalcin, O. Mutlu, E. F. Haratsch, A. Cristal, O. S. Unsal, and K. Mai, "Flash correct-and-refresh: Retention-aware error management for increased flash memory lifetime," in Computer Design (ICCD), 2012 IEEE 30th International Conference on. IEEE, 2012, pp. 94-101.

B. Shin, C. Seol, J.-S. Chung, and J. J. Kong, "Error control coding and signal processing for flash memories," in Circuits and Systems (ISCAS), 2012 IEEE International Symposium on. IEEE, 2012, pp. 409-412.

H. Tabrizi, G. Farhadi, and J. Cioffi, "A learning-based network selection method in heterogeneous wireless systems," in Global Telecommunications Conference (GLOBECOM 2011), 2011 IEEE, Dec. 2011, pp. 1-5.

N. Mielke, H. Belgal, A. Fazio, Q. Meng, and N. Righos, "Recovery effects in the distributed cycling of flash memories," in Reliability Physics Symposium Proceedings, 2006. 44th Annual., IEEE International, Mar. 2006, pp. 29-35.

R. Pyndiah, A. Glavieux, A. Picart, and S. Jacq, "Near optimum decoding of prodcut codes," iin Proc. IEEE Global Telecommunications Conference GLOBECOM, pp. 339-343, 1994.

J. Han and L. A. Lastras-Montano, "Reliable memories with subline accesses," in Proc. 2010 IEEE Int. Symp. on Inform. Theory (ISIT), pp. 2531-2535, Jul. 2010.

A. S. Rawat, D. S. Papailiopoulos, A. G. Dimakis, and S. Vishwanath, "Locality and availability in distributed storage," Preprint available at http://arxiv.org/abs/1402.2011, Feb. 2014.

P. Gopalan, C. Huang, H. Simitci, and S. Yekhani, "On the locality of codeword Symbols," Preprint available at http://arxiv.org/abs/1106.3625, Jun. 2011.

F. Oggier and A. Datta, "Self-repairing homomorphic codes for distributed storage systems," in Proc. IEEE International Conference on Computer Communications (Infocom), Shanghai, China, Apr. 2011.

D. Papailiopoulos, J. Luo, A. Dimakis, C. Huang, and J. Li, "Simple regenerating codes: network coding for cloud storage," IEEE International Conference on Computer Communications (Infocom), 2012.

O. Khan, R. Burns, J. Plank, and C. Huang, "In search of I/O-optimal recovery from disk failures," in Hot Storage 2011, 3rd Workshop on Hot Topics in Storage and File Systems, Portland, OR, Jun. 2011.

C. Huang, M. Chen, and J. Li, "Pyramid codes: flexible schemes to trade space for access efficiency in reliable data storage systems," in Proc. IEEE International Symposium on Network Computing and Applications (NCA), Cambridge, MA, Jul. 2007.

H. Zhou, A. Jiang, and J. Bruck, "Error-correcting schemes with dynamic thresholds in nonvolatile memories," in Information Theory Proceedings (ISIT), 2011 IEEE International Symposium on. IEEE, 2011, pp. 2143-2147.

B. Peleato, R. Agarwal, J. Cioffi, M. Qin, and P. H. Siegel, "Towards minimizing read time for NAND flash," in Global Communications Conference (GLOBECOM), 2012 IEEE. IEEE, 2012, pp. 3219-3224.

Y. Kim, B. Vijaya Kumar, K. L. Cho, H. Son, J. Kim, J. J. Kong, and J. Lee, "Modulation coding for flash memories," in Computing, Networking and Communications (ICNC), 2013 International Conference on. IEEE, 2013, pp. 961-967.

Y. Cai, O. Mutlu, E. F. Haratsch, and K. Mai, "Program interference in MLC NAND flash memory: Characterization, modeling, and mitigation," in Computer Design (ICCD), 2013 IEEE 31st International Conference on. IEEE, 2013, pp. 123-130.

Y. Cai, E. F. Haratsch, O. Mutlu, and K. Mai, "Threshold voltage distribution in MLC NAND flash memory: Characterization, analysis, and modeling," in Proceedings of the Conference on Design, Automation and Test in Europe. EDA Consortium, 2013, pp. 1285-1290.

E. Yaakobi, J. Ma, L. Grupp, P. Siegel, S. Swanson, and J. Wolf, "Error characterization and coding schemes for flash memories," in GLOBECOM Workshops (GC Wkshps), 2010 IEEE IEEE, Dec. 2010, pp. 1856-1860.

B. Peleato and R. Agarwal, "Maximizing MLC NAND lifetime and reliability in the presence of write noise," in Proc. of IEEE International Conf. Comm., 2012.

Office Action in corresponding Japanese Patent Application No. 2015-191057, dated Oct. 25, 2016 (18 pages).

* cited by examiner

US 9,690,655 B2

METHOD AND SYSTEM FOR IMPROVING FLASH STORAGE UTILIZATION BY PREDICTING BAD M-PAGES

BACKGROUND

One important performance metric for a storage system is the latency related to retrieving data stored in the storage system. The performance of the storage system improves with a decrease in the read latency. The read latency for a storage system may be decreased if the storage system is able to reliably retrieve error-free data from the storage medium. When error-free data is not retrieved, the storage system may perform additional actions in order to remove the errors from the retrieved data. For example, the storage system may use error correction mechanisms such as error correcting codes (ECC) and/or RAID to remove errors from the retrieved data or otherwise generate error-free data. The use of error correction mechanisms results in an increase in read latency, which is accompanied with a corresponding decrease in performance.

SUMMARY

In general, in one aspect, the invention relates to a method for managing persistent storage, the method comprising selecting a page for a proactive read request, wherein the page is located in the persistent storage, issuing the proactive read request to the page, receiving, in response to the proactive read request, a bit error value (BEV) for data stored on the page, obtaining a BEV threshold (T) for the page, wherein T is determined using a program/erase cycle value associated with the page and a retention time of the data stored on the page, making a first determination that the BEV is greater than T, based on the first determination: identifying an m-page, wherein the m-page is a set of pages, wherein the page is in the set of pages, setting the m-page as non-allocatable for future operations.

In general, in one aspect, a system, comprising a storage module comprising a storage module controller and persistent storage, and a control module operatively connected to the storage module and a client, wherein the control module performs at least the following steps: selecting a page for a proactive read request, wherein the page is located in the persistent storage, issuing the proactive read request to the page, receiving, in response to the proactive read request, a bit error value (BEV) for data stored on the page, obtaining a BEV threshold (T) for the page, wherein T is determined using a program/erase cycle value associated with the page and a retention time of the data stored on the page, making a first determination that the BEV is greater than T, based on the first determination: identifying an m-page, wherein the m-page is a set of pages, wherein the page is in the set of pages, and setting the m-page as non-allocatable for future operations.

In general, in one aspect, the invention relates to

A non-transitory computer readable medium comprising computer readable program code, which when executed by a computer processor enables the computer processor to select a page for a proactive read request, wherein the page is located in the persistent storage, issue the proactive read request to the page, receive, in response to the proactive read request, a bit error value (BEV) for data stored on the page, obtain a BEV threshold (T) for the page, wherein T is determined using a program/erase cycle value associated with the page and a retention time of the data stored on the page make a first determination that the BEV is greater than T, based on the first determination: identify an m-page, wherein the m-page is a set of pages, wherein the page is in the set of pages, and set the m-page as non-allocatable for future operations.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description In the following description of FIGS. 1-7D, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or place of the embodiments described with regard to a corresponding like-named component in any other figure.

In general, embodiments of the invention relate to increasing the utilization of solid-state storage by proactively identifying pages in solid-state memory for which there is a high likelihood that previously stored data will not be retrievable when subsequently requested. Said another way, embodiments of the invention proactively identify pages that may fail in the future, where such failures are likely to trigger execution of an error correction mechanism such as a RAID (Redundant Array of Inexpensive Disks) scheme. Embodiments of the invention proactively identify pages that are likely to fail based on whether a bit error value (BEV) for data on a proactively-read page is greater than a threshold (T), where T depends on a P/E cycle value (p) of the page and the retention time (t) of the data on the proactively-read page. The ability to proactively identify pages that have a high likelihood of failure in the future results in limiting such pages from storing data and, as a result, limiting the need to invoke error correction mechanisms in order to read stored data. Because RAID (or other error-correction mechanisms) are less likely to be invoked, the performance of the system increases (i.e., there is a lower read latency for servicing read requests).

The following description describes one or more systems and methods for implementing one or more embodiments of the invention.

Figure 1A:
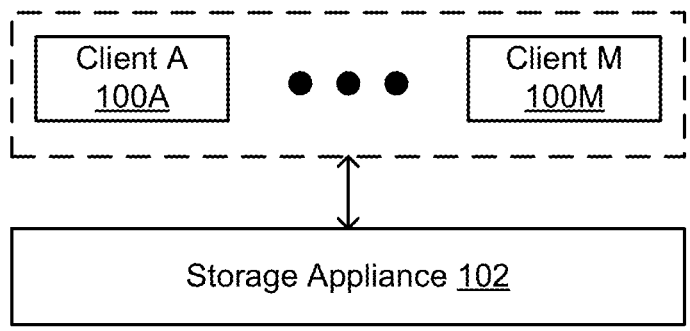
FIGS. 1A-1C show systems in accordance with one or more embodiments of the invention.
Figure 1B:
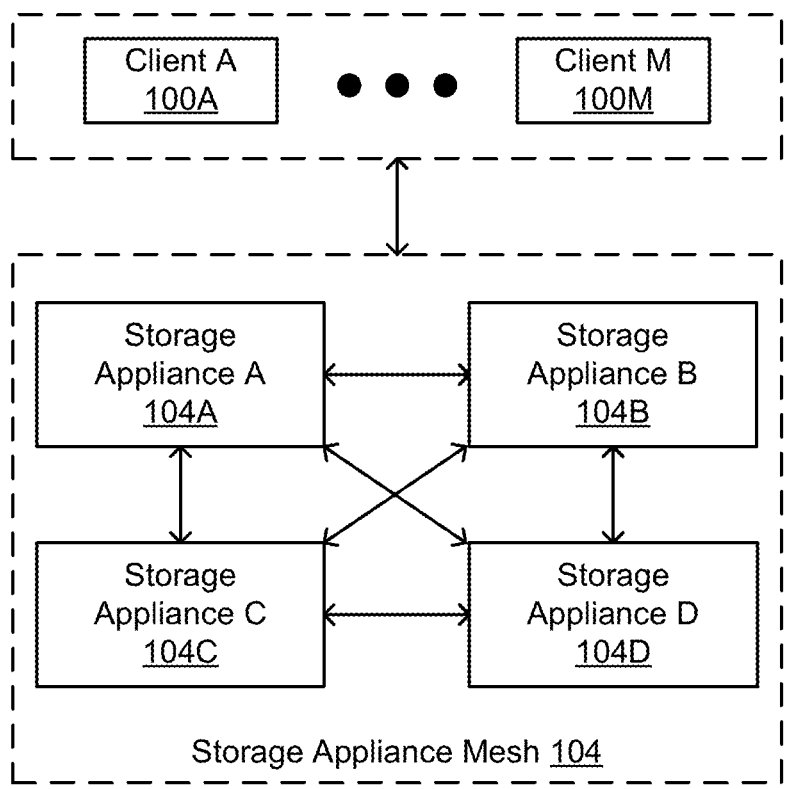
Figure 1C:
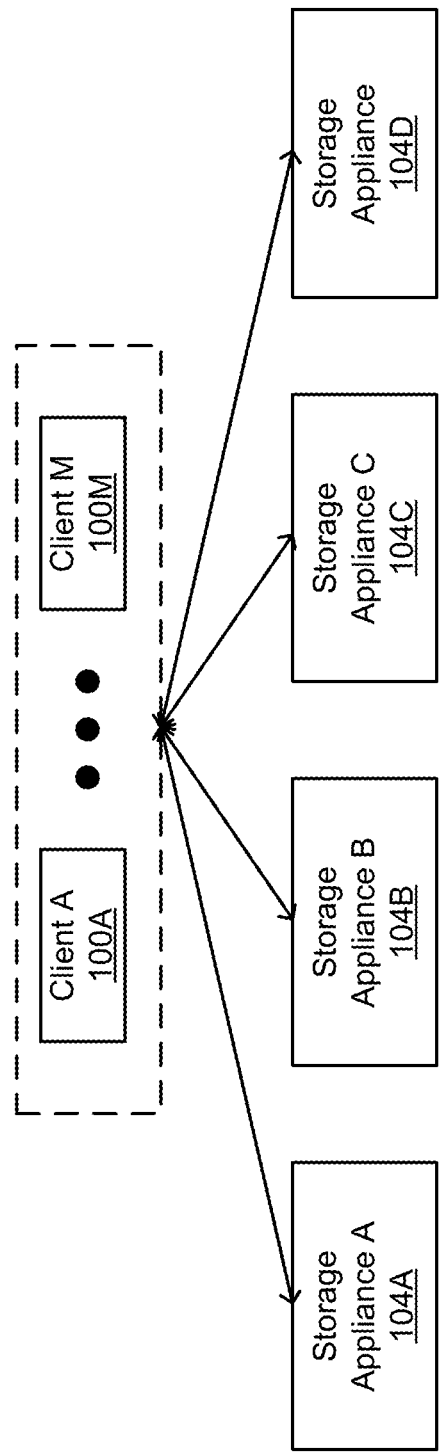

FIGS. 1A-1C show systems in accordance with one or more embodiments of the invention. Referring to FIG. 1A, the system includes one or more clients (client A (100A), client M (100M)) operatively connected to a storage appliance (102).

In one embodiment of the invention, clients (100A, 100M) correspond to any physical system that includes functionality to issue a read request to the storage appliance (102) and/or issue a write request to the storage appliance (102). Though not shown in FIG. 1A, each of the clients (100A, 100M) may include a client processor (not shown), client memory (not shown), and any other software and/or hardware necessary to implement one or more embodiments of the invention.

In one embodiment of the invention, the client (100A-100M) is configured to execute an operating system (OS) that includes a file system. The file system provides a mechanism for the storage and retrieval of files from the storage appliance (102). More specifically, the file system includes functionality to perform the necessary actions to issue read requests and write requests to the storage appliance. The file system also provides programming interfaces to enable the creation and deletion of files, reading and writing of files, performing seeks within a file, creating and deleting directories, managing directory contents, etc. In addition, the file system also provides management interfaces to create and delete file systems. In one embodiment of the invention, to access a file, the operating system (via the file system) typically provides file manipulation interfaces to open, close, read, and write the data within each file and/or to manipulate the corresponding metadata.

Continuing with the discussion of FIG. 1A, in one embodiment of the invention, the clients (100A, 100M) are configured to communicate with the storage appliance (102) using one or more of the following protocols: Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric. Those skilled in the art will appreciate that the invention is not limited to the aforementioned protocols.

In one embodiment of the invention, the storage appliance (102) is a system that includes volatile and persistent storage and is configured to service read requests and/or write requests from one or more clients (100A, 100M). Various embodiments of the storage appliance (102) are described below in FIG. 2.

Referring to FIG. 1B, FIG. 1B shows a system in which clients (100A, 100M) are connected to multiple storage appliances (104A, 104B, 104C, 104D) arranged in a mesh configuration (denoted as storage appliance mesh (104) in FIG. 1B). As shown in FIG. 1B, the storage appliance mesh (104) is shown in a fully-connected mesh configuration—that is, every storage appliance (104A, 104B, 104C, 104D) in the storage appliance mesh (104) is directly connected to every other storage appliance (104A, 104B, 104C, 104D) in the storage appliance mesh (104). In one embodiment of the invention, each of the clients (100A, 100M) may be directly connected to one or more storage appliances (104A, 104B, 104C, 104D) in the storage appliance mesh (104). Those skilled in the art will appreciate that the storage appliance mesh may be implemented using other mesh configurations (e.g., partially connected mesh) without departing from the invention.

Referring to FIG. 1C, FIG. 1C shows a system in which clients (100A, 100M) are connected to multiple storage appliances (104A, 104B, 104C, 104D) arranged in a fan-out configuration. In this configuration, each client (100A, 100M) is connected to one or more of the storage appliances (104A, 104B, 104C, 104D); however, there is no communication between the individual storage appliances (104A, 104B, 104C, 104D).

Those skilled in the art will appreciate that while FIGS. 1A-1C show storage appliances connected to a limited number of clients, the storage appliances may be connected to any number of clients without departing from the invention. Those skilled in the art will appreciate that while FIGS. 1A-1C show various system configurations, the invention is not limited to the aforementioned system configurations. Further, those skilled in the art will appreciate that the clients (regardless of the configuration of the system) may be connected to the storage appliance(s) using any other physical connection without departing from the invention.

Figure 2:
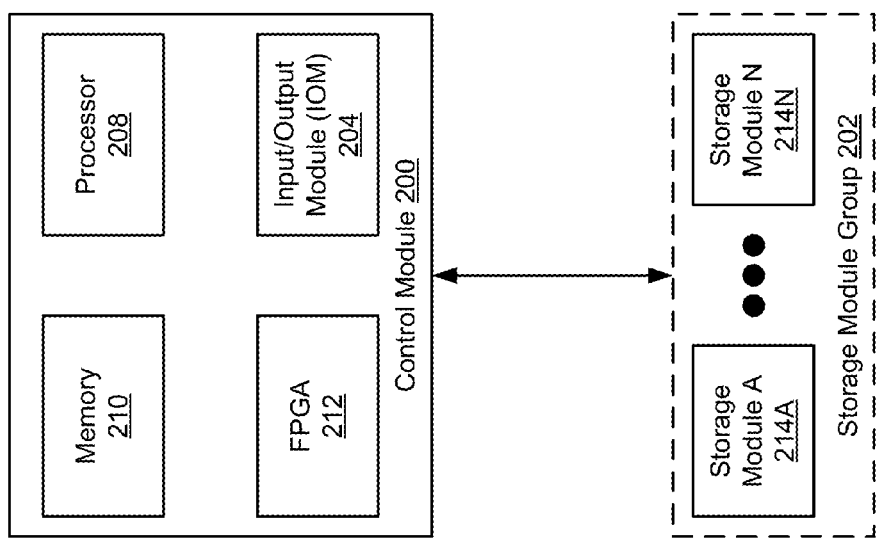
FIG. 2 shows storage appliances in accordance with one or more embodiments of the invention.

FIG. 2 shows embodiments of a storage appliance in accordance with one or more embodiments of the invention. The storage appliance includes a control module (200) and a storage module group (202). Each of these components is described below. In general, the control module (200) is configured to manage the servicing of read and write requests from one or more clients. In particular, the control module is configured to receive requests from one or more clients via the IOM (discussed below), to process the request (which may include sending the request to the storage module), and to provide a response to the client after the request has been serviced. In addition, the control module (200) includes functionality to generate and issue proactive read requests and to also perform various garbage collection operations. The operation of the control module with respect to servicing read requests is described below with reference to FIGS. 5 and 6 Additional details about the components in the control module are included below.

Continuing with the discussion of FIG. 2, in one embodiment of the invention, the control module (200) includes an Input/Output Module (IOM) (204), a processor (208), a memory (210), and, optionally, a Field Programmable Gate Array (FPGA) (212). In one embodiment of the invention, the IOM (204) is the physical interface between the clients (e.g., 100A, 100M in FIGS. 1A-1C) and the other components in the storage appliance. The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE). Those skilled in the art will appreciate that the IOM may be implemented using protocols other than those listed above without departing from the invention.

Continuing with FIG. 2, the processor (208) is a group of electronic circuits with a single core or multi-cores that are configured to execute instructions. In one embodiment of the invention, the processor (208) may be implemented using a Complex Instruction Set (CISC) Architecture or a Reduced Instruction Set (RISC) Architecture. In one or more embodiments of the invention, the processor (208) includes a root complex (as defined by the PCIe protocol). In one embodiment of the invention, if the control module (200) includes a root complex (which may be integrated into the processor (208)) then the memory (210) is connected to the processor (208) via the root complex. Alternatively, the memory (210) is directly connected to the processor (208) using another point-to-point connection mechanism. In one embodiment of the invention, the memory (210) corresponds to any volatile memory including, but not limited to, Dynamic Random-Access Memory (DRAM), Synchronous DRAM, SDR SDRAM, and DDR SDRAM.

In one embodiment of the invention, the processor (208) is configured to create and update an in-memory data structure (not shown), where the in-memory data structure is stored in the memory (210). In one embodiment of the invention, the in-memory data structure includes information described in FIG. 4.

In one embodiment of the invention, the processor is configured to offload various types of processing to the FPGA (212). In one embodiment of the invention, the FPGA (212) includes functionality to calculate checksums for data that is being written to the storage module(s) and/or data that is being read from the storage module(s). Further, the FPGA (212) may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment of the invention, the storage module group (202) includes one or more storage modules (214A, 214N) each configured to store data. One embodiment of a storage module is described below in FIG. 3.

Figure 3:
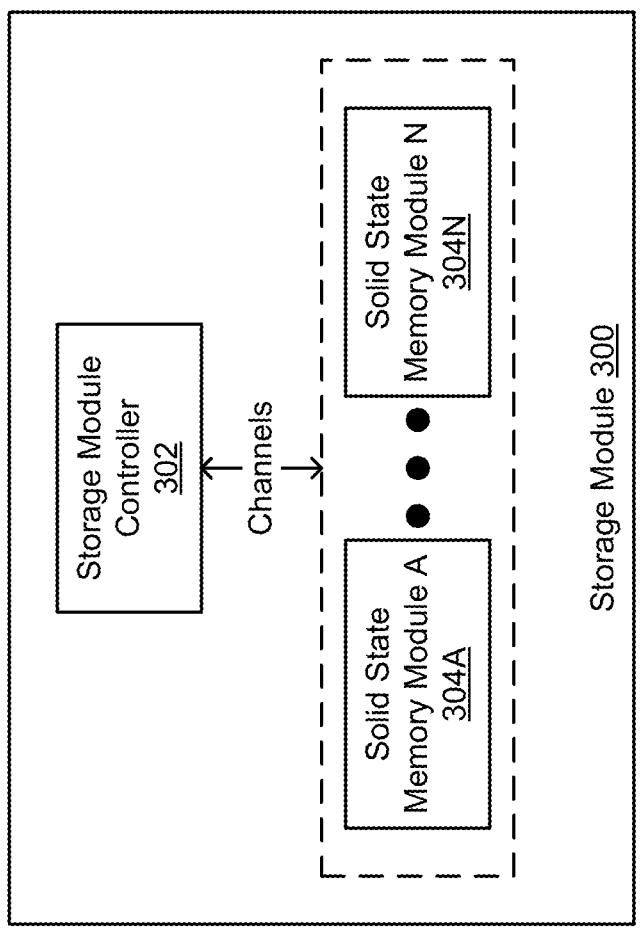
FIG. 3 shows a storage module in accordance with one or more embodiments of the invention.

FIG. 3 shows a storage module in accordance with one or more embodiments of the invention. The storage module (300) includes a storage module controller (302), memory (not shown), and one or more solid-state memory modules (304A, 304N). Each of these components is described below.

In one embodiment of the invention, the storage module controller (300) is configured to receive requests to read from and/or write data to one or more control modules. Further, the storage module controller (300) is configured to service the read and write requests using the memory (not shown) and/or the solid-state memory modules (304A, 304N).

In one embodiment of the invention, the memory (not shown) corresponds to any volatile memory including, but not limited to, Dynamic Random-Access Memory (DRAM), Synchronous DRAM, SDR SDRAM, and DDR SDRAM.

In one embodiment of the invention, the solid-state memory modules correspond to any data storage device that uses solid-state memory to store persistent data. In one embodiment of the invention, solid-state memory may include, but is not limited to, NAND Flash memory and NOR Flash memory. Further, the NAND Flash memory and the NOR flash memory may include single-level cells (SLCs), multi-level cell (MLCs), or triple-level cells (TLCs). Those skilled in the art will appreciate that embodiments of the invention are not limited to storage class memory.

Figure 4:
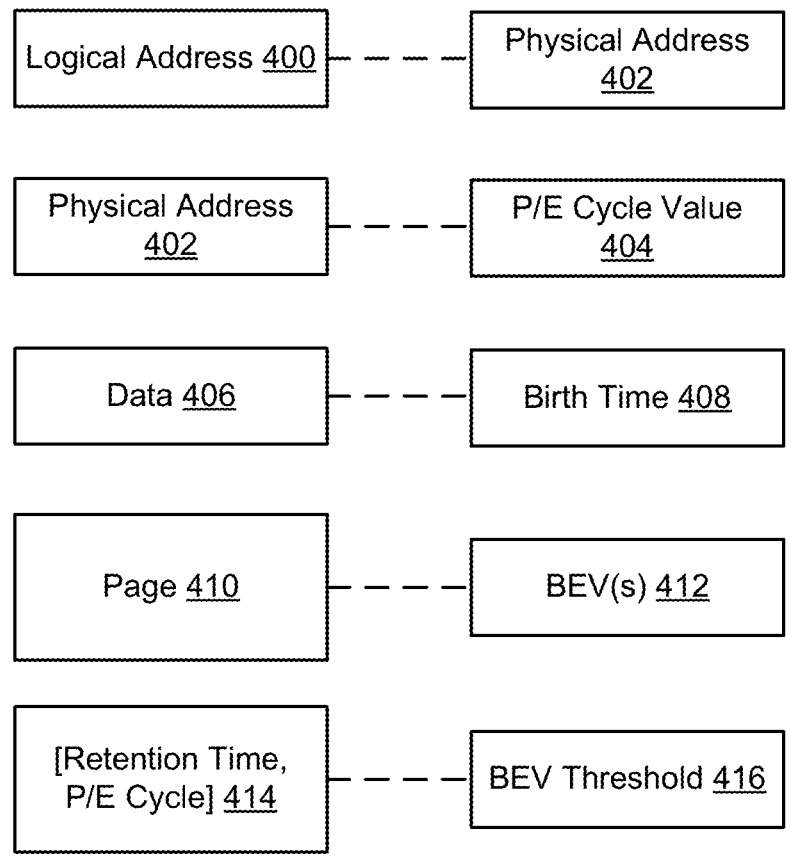
FIG. 4 shows the relationship between various components in accordance with one or more embodiments of the invention.

FIG. 4 shows the relationship between various components in accordance with one or more embodiments of the invention. More specifically, FIG. 4 shows the various types of information that are stored in the memory of the control module. Further, the control module includes functionality to update the information stored in the memory of the control module. The information described below may be stored in one or more in-memory data structures. Further, any data structure type (e.g., arrays, linked lists, hash tables, etc.) may be used to organize the following information within the in-memory data structure(s) provided that the data structure type(s) maintains the relationships (as described below) between the information.

The memory includes a mapping of logical addresses (400) to physical addresses (402). In one embodiment of the invention, the logical address (400) is an address at which the data appears to reside from the perspective of the client (e.g., 100A, 100M in FIG. 1A). Said another way, the logical address (400) corresponds to the address that is used by the file system on the client when issuing a read request to the storage appliance.

In one embodiment of the invention, the logical address is (or includes) a hash value generated by applying a hash function (e.g., SHA-1, MD-5, etc.) to an n-tuple, where the n-tuple is <object ID, offset ID>. In one embodiment of the invention, the object ID defines a file and the offset ID defines a location relative to the starting address of the file. In another embodiment of the invention, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the invention, the logical address includes an object ID and an offset ID. Those skilled in the art will appreciate that multiple logical addresses may be mapped to a single physical address, and that the logical address content and/or format is not limited to the above embodiments.

In one embodiment of the invention, the physical address (402) corresponds to a physical location in a solid-state memory module (304A, 304N) in FIG. 3. In one embodiment of the invention, the physical address is defined as the following n-tuple: <storage module, channel, chip enable, LUN, plane, block, page number, byte>.

In one embodiment of the invention, each physical address (402) is associated with a program/erase (P/E) cycle value (404). The P/E cycle value may represent: (i) the number of P/E cycles that have been performed on the physical location defined by the physical address or (ii) a P/E cycle range (e.g., 5,000-9,999 P/E cycles), where the number of P/E cycles that have been performed on the physical location defined by the physical address is within the P/E cycle range. In one embodiment of the invention, a P/E cycle is the writing of data to one or more pages in an erase block (i.e., the smallest addressable unit for erase operations, typically, a set of multiple pages) and the erasure of that block, in either order.

The P/E cycle values may be stored on a per page basis, a per block basis, on a per set of blocks basis, and/or at any other level of granularity. The control module includes functionality to update, as appropriate, the P/E cycle values (402) when data is written to (and/or erased from) the solid-state storage modules.

In one embodiment of the invention, all data (i.e., data that the file system on the client has requested be written to solid-state storage modules) (406) is associated with a birth time (408). The birth time (408) may correspond to: (i) the time the data is written to a physical location in a solid-state storage module; (ii) the time that the client issued a write request to write the data to a solid-state storage module; or (iii) a unitless value (e.g., a sequence number) that corresponds to the write events in (i) or (ii).

In one embodiment of the invention, the in-memory data structure includes at least one bit error value (BEV) for any page that has been read as part of a read request or as part of a proactive read request. The BEV specifies the number of bits in retrieved data (i.e., data that is read from a page in response to a read request or a proactive read request) that are incorrect. The BEV may alternatively be expressed as a percentage of bits in a given page that are incorrect. The BEV for a given page may be determined using an error-correcting code (ECC), where the ECC for data stored on a given page is also stored on the page. Said another way, a page may include data and ECC for the data. The BEV for the page may be determined by the storage module controller (e.g., FIG. 3, 302). The memory (FIG. 2, 210) in the control module may store the last BEV obtained from a given page and/or may store multiple BEV for a given page.

Figure 5:
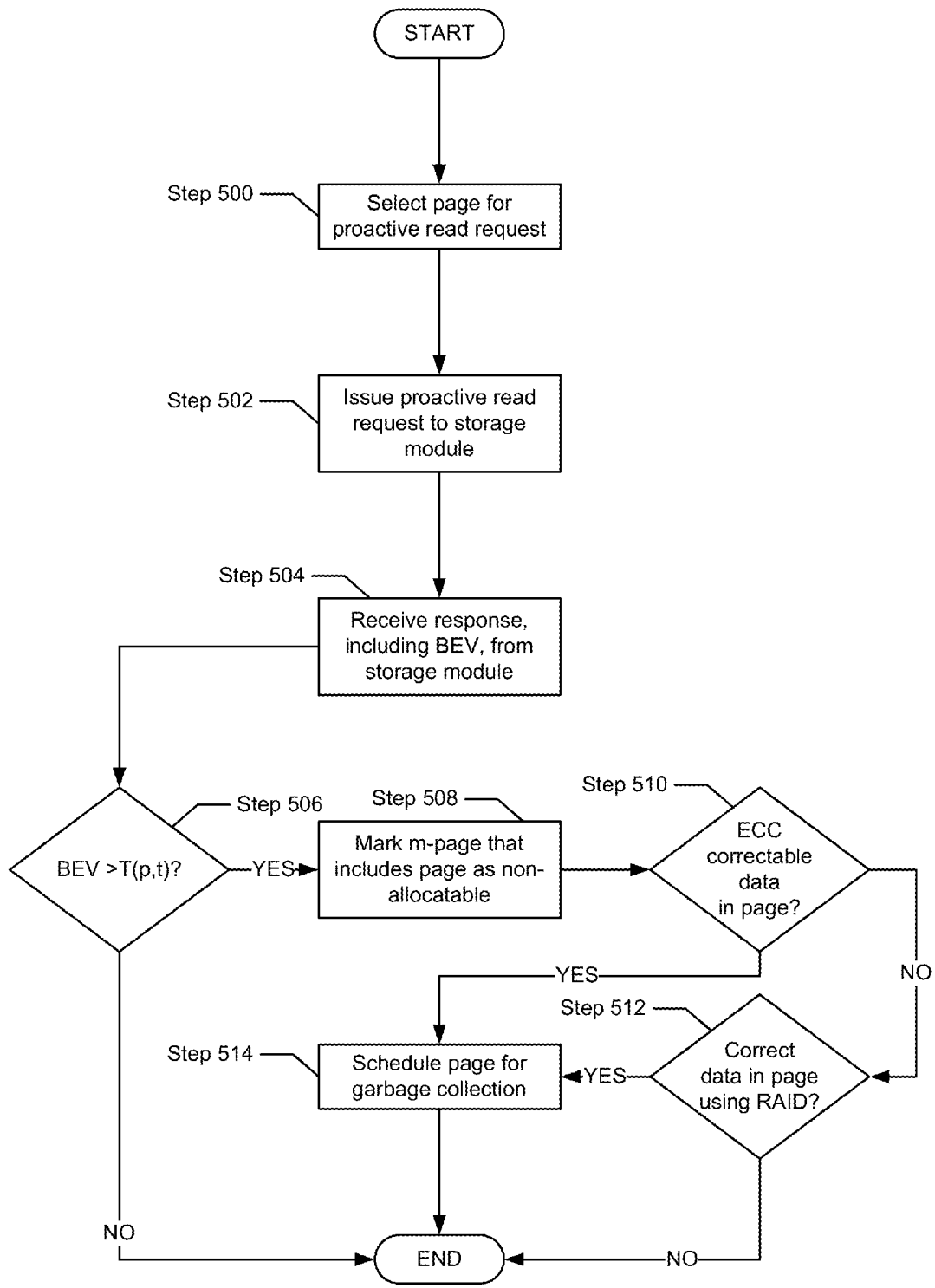
FIG. 5 shows a method for processing proactive read requests in accordance with one or more embodiments of the invention.
Figure 6:
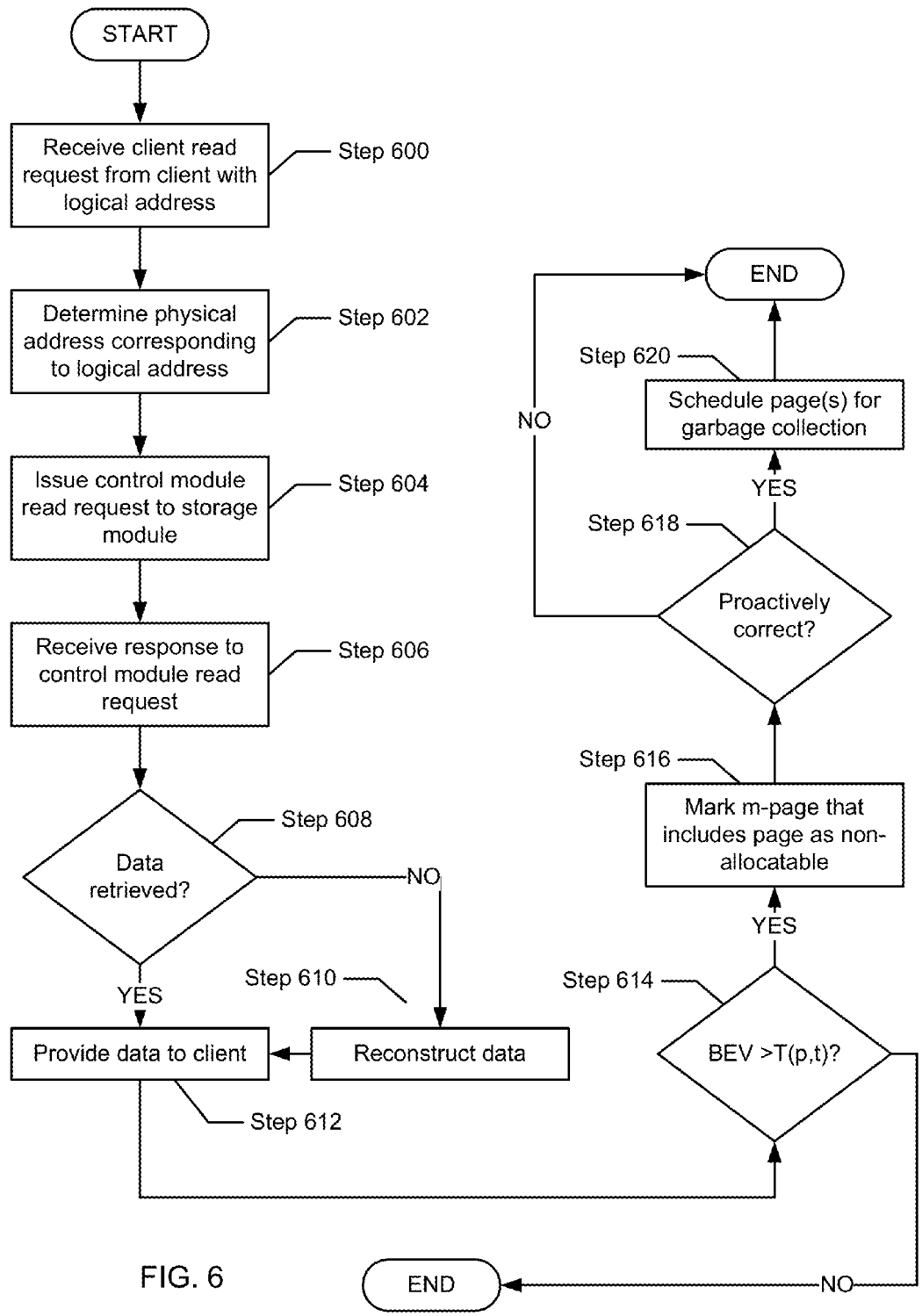
FIG. 6 shows a method for processing read requests in accordance with one or more embodiments of the invention.

The stored BEV values may be used as part of the determination in step 512 in FIG. 5 and step 618 in FIG. 6. Additional detail regarding the use of stored BEVs is described below in FIGS. 5 and 6.

In one embodiment of the invention, the in-memory data structure includes a mapping of <retention time, P/E cycle value> to a BEV threshold (416). In one embodiment of the invention, the retention time corresponds to the time that has elapsed between the writing of the data to a solid-state storage module and the time that the data is being read from the solid-state storage module. The retention time may be expressed in units of time (second, days, months, etc.) or may be expressed as a unitless value (e.g., when the birth time is expressed as a unitless value). In one embodiment of the invention, the P/E cycle value in <retention time, P/E cycle value> may be expressed as a P/E cycle or a P/E cycle range.

In one embodiment of the invention, the BEV thresholds (416) are ascertained by conducting experiments to determine BEVs at time t which predict failure of a page at time t+1 for a given combination of retention time and P/E cycle value. The BEV thresholds (416) are optimized in order to be able to successfully read data from a solid-state memory module while not unnecessarily marking m-pages in the persistent storage as non-allocatable.

By modifying the BEV threshold value(s) based upon retention time and P/E cycle value, the storage appliance takes into account the various variables that may alter the likelihood of failure of a given page at a given retention time and P/E cycle value. By understanding how the pages fail over time based on the above variables, an appropriate BEV threshold may be used in order to proactively determine whether a given page may fail in the future.

In one embodiment of the invention, the BEV threshold (416) for a given <retention time (t), P/E cycle value (p)> may be determined experimentally as follows: (i) determine BEV for a set of pages at time t+1 (e.g., at retention time two months) for a P/E cycle value (p); (ii) identify all pages that would trigger the use of RAID (or another error correcting mechanism) (i.e., all pages for which ECC may not be used to correct the errors in the retrieved data); (iii) determine BEV for all pages identified in (ii) at time t (e.g., at retention time one month) for P/E cycle value (p) (i.e., the same P/E cycle value as used in (i)); (iv) identifying a BEV threshold (T(p,t)) by reducing the number of pages identified in (ii) until an error-correcting mechanism activation limit (e.g., only 1% of reads should trigger the use of an error-correcting mechanism at t+1) is meet for time t+1.

More specifically, in (iv) pages identified in (ii) are sequentially removed from the set of pages identified in (ii) starting with the pages in (ii) that have the highest BEVs. For each page that is removed from (ii), the other pages in the m-page of which the removed page is a part are also removed (e.g., if the page A is removed from (ii) and an m-page has four pages, then the other three pages that are part of the m-page to which page A belongs are also removed). The result of removing the aforementioned pages at time t results in these pages not storing any data at time t+1, and, consequently, these pages cannot trigger activation of an error-correcting mechanism at t+1. An example of determining a BEV threshold is described in FIGS. 7A-7C.

In one embodiment of the invention, the control module (FIG. 2, 200) uses the information described above (see FIG. 4) to perform one or more of the following: (i) servicing client read requests; (ii) servicing write requests; (iii) servicing proactive read requests; and (iv) garbage collection operations. The control module may be performing one or more of the following requests and/or operations in parallel.

In one embodiment of the invention, a client read request is issued by a client (e.g., FIG. 1A, 100A) where the read request includes a logical address. The response to the read request is: (i) data retrieved from the persistent storage and, optionally, a BEV for the data retrieved from the persistent storage or (ii) a notification indicating the data is corrupted (i.e., the data cannot be retrieved from the persistent storage and/or the data cannot be corrected or reconstructed using error correcting mechanisms implemented by the storage module controller and/or the control module). Additional detail related to serving read requests is included in FIG. 6 below.

In one embodiment of the invention, a proactive read request is issued by the control module (e.g., FIG. 2, 200) where the proactive read request includes a physical address. The response to the proactive read request is: a BEV for the data retrieved from the persistent storage and, optionally, the data retrieved from the persistent storage. Additional detail related to serving read requests is included in FIG. 5 below.

In one embodiment of the invention, a write request is issued by a client (e.g., FIG. 1A, 100A) where the write request includes data or a reference to data that is to be stored in persistent storage. Upon receipt of a write request, the control module determines one or more pages to be used to store the data in the persistent storage. The pages selected to store the data are identified from the set of allocatable page in the persistent storage, where the control module maintains a listing of the allocatable pages. A page is deemed to be an allocatable page (discussed below in FIGS. 5 and 6) when data may be written to the page as part of a write request or as part of a garbage collection operation (described below).

In one embodiment of the invention, the garbage collection operation that is performed as part of a garbage collection process implemented by the control module. The aim of the garbage collection process is to reclaim dead pages (i.e., pages that no longer include live data (i.e., data that is being used by the control module and/or one or more applications executing on a client)). This may be achieved by: (i) identifying blocks in the persistent storage that include a combination of live pages and dead pages; and (ii) moving the live data to one or more pages in another block(s) in the persistent storage that only includes live pages. The data that is rewritten to a new page(s) as part of the garbage collection operation may only be written to a page(s) that is an allocatable page (discussed below in FIGS. 5 and 6)

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 5 shows a method for processing client read requests by a storage appliance in accordance with one or more embodiments of the invention.

In step 500, a page in the persistent storage is selected for a proactive read request. The page may be any live page in the persistent storage (i.e., any page that includes live data). The list of live pages may be maintained/managed by the control module and stored in the memory within the control module.

In step 502, a proactive read request is issued by the control module to a storage module, where the storage module is the storage module that includes a solid-state memory module on which the page (selected in step 500) is located. The format of the read request may be any format that is supported by the storage module controller. The proactive read request may include a physical address of the page (selected in step 500) along with a flag (or other content) which indicates that the request is a proactive read request versus, for example, a client read request.

In step 504, a response is received from the storage module that includes at least the BEV for the data that is read from the page (i.e., the page selected in step 500).

In step 506, a determination is made about whether the BEV is greater than a BEV threshold (T(t,p)) for a given retention time and P/E cycle value. In one embodiment of the invention, the retention time (t) is determined for the data stored at the physical address. The retention time may be determined using the birth time of the data (see FIG. 4, 408) and the time of the proactive read request (e.g., the time the control module issued the proactive read request). The birth time of the data is obtained from the memory (e.g., FIG. 2, 210) of the control module. The retention time may be calculated by determining the difference between the time of the proactive read request and the birth time. In one embodiment of the invention, the P/E cycle may be determined by performing a look-up in an in-memory data structure (located in the memory of the control module) using the physical address of the page as the key. The result of the query may be the actual P/E cycle value associated with the physical address (e.g., the P/E cycle value associated with the block in which the physical location corresponding to the physical address is located) or may be a P/E cycle value range (e.g., 5,000-9,999 P/E cycles), where the actual P/E cycle value associated with the physical address is within the P/E cycle value range. The BEV threshold (T(t,p)) is obtained from an in-memory data structure (see FIG. 4) using the following key <retention time, P/E cycle value>.

If the BEV is less than a BEV threshold (T(t,p)) for a given retention time and P/E cycle value, then the process ends; otherwise, the process proceeds to step 508.

In step 508, the m-page that includes the page (selected in step 500) is marked as non-allocatable. More specifically, each page that is part of the same m-page as the page (selected in step 500) is marked as non-allocatable. Once a page is marked as non-allocatable, the page is not used to store any future live data as part of a write operation or a garbage collection operation. In one embodiment of the invention, an m-page is one or more pages. The pages in an m-page may be written to the persistent storage in a single atomic transaction. For example, the m-page may be four pages that are be written to the persistent storage in a single atomic transaction. If the writing of data to a single page of the m-page fails, then the entire transaction (i.e., the writing of data to the four pages that make up the m-page) fails.

Continuing with the discussion of FIG. 5, in step 510, a determination is made about whether the data in the page (selected in step 500) is ECC correctable (i.e., can the storage module controller correct the errors in the data using only the ECC of the page). If the data in the page is ECC correctable, then the process proceeds to step 514; otherwise, the process proceeds to step 512.

In step 512, a determination is made about whether to invoke a RAID scheme or another error-correcting mechanism to reconstruct the corrupted data in the page (selected in step 500) as part of a garbage collection process. The determination of whether to invoke a RAID scheme or another error-correcting mechanism to reconstruct the corrupted data may be based on the state of the other pages in the RAID stripe (of which the page is a part).

For example, if there are six pages in the RAID stripe (four data pages, one P parity page, one Q parity page) and only one page is corrupted, then a determination may be made not to invoke a RAID scheme or another error-correcting mechanism as the above RAID stripe may still have sufficient non-corrupted pages to reconstruct all data within the RAID stripe. Said another way, the above RAID stripe may be able to reconstruct all data within the RAID stripe, provided that there are at least four non-corrupted pages in the RAID stripe. As there are five non-corrupted pages currently in the RAID stripe, one additional page in the RAID stripe may be corrupted without impacting the ability to recover the data. However, if the aforementioned RAID stripe includes two corrupted pages (i.e., pages that were not ECC correctable), then a determination is made to reconstruct the data on the page (selected in step 500) as well as the data in the other corrupted page as one additional corrupted page in the RAID stripe (i.e., three corrupted pages) would result in no ability to reconstruct the any of the corrupted data in the RAID stripe.

In one embodiment of the invention, the control module tracks the RAID stripe membership (i.e., which pages are part of the RAID stripe) and the RAID stripe geometry (i.e., the number of parity pages, the type of parity value (e.g., P parity value, Q parity value, etc.) in each parity page). The control module may use the BEVs (412) to determine which of the pages in a given RAID stripe are ECC correctable and not ECC correctable.

Those skilled in the art will appreciate that other policies may be used to determine whether to invoke a RAID scheme or another error-correcting mechanism without departing from the invention.

Continuing with the discussion of FIG. 5, in step 514, if the data in the page is ECC correctable, then the page is scheduled for garbage collection. Scheduling the page (or the block in which the page is located) for garbage collection may include scheduling the page as the next page to be processed as part of garbage collection operation (i.e., the live data is read from the page and rewritten (once corrected by ECC) to a new allocatable page in the persistent storage).

Continuing with Step 514, if the data on the page is not ECC correctable, then the data on the page must be reconstructed using a RAID scheme. More specifically, the page is scheduled for garbage collection. Scheduling the page (or the block in which the page is located) for garbage collection may include scheduling the page as the next page to be processed as part of garbage collection operation (i.e., the data for the page is reconstructed and the reconstructed data is written to a new allocatable page in the persistent storage).

The reconstruction of the data on the page may include reading data from multiple other pages in the RAID stripe and then performing one or more operations by the control module in order to reconstruct the data on the page. The process then ends.

In one embodiment of the invention, the process shown in FIG. 5 is periodically performed on all live pages in the persistent storage. The process shown in FIG. 5 may be implemented using a low priority thread executing in the control module.

FIG. 6 shows a method for processing client read requests by a storage appliance in accordance with one or more embodiments of the invention.

In step 600, a client read request is received by the control module from a client, where the client read request includes a logical address. In step 602, a physical address (which includes the page number) is determined from the logical address. As discussed above, the memory in the control module includes a mapping of logical addresses to physical addresses (see discussion of FIG. 4, 400, 402). In one embodiment of the invention, the physical address is determined by performing a look-up (or query) using the mapping of logical addresses to physical addresses along with the logical address obtained from the client request in Step 600.

In step 604, a control module read request is generated using the physical address. The format of the control module read request may be any format that is supported by the storage module controller.

In step 606, a response is received from the storage module that includes the BEV for the data that is read from the page (i.e., the page selected in step 500) and either (i) the data from the page or (ii) an indication that the data is corrupted (i.e., the data on the page is not ECC correctable).

In step 608, a determination is made about whether the response received in step 606 includes data. If the response received in step 606 includes data, the process proceeds to step 612; otherwise, the process proceeds to step 610

In step 610, when the response received in step 606 does not include data, the control module proceeds to reconstruct the data on the page using, e.g., a RAID scheme or another error-correcting mechanism.

In step 612, the data (or the reconstructed data) is provided to the client. In step 614, a determination is made about whether the BEV is greater than a BEV threshold (T(t,p)) for a given retention time and P/E cycle value. In one embodiment of the invention, the retention time (t) is determined for the data stored at the physical address. If the BEV is less than a BEV threshold (T(t,p)) for a given retention time and P/E cycle value, then the process ends; otherwise, the process proceeds to step 616.

In step 616, the m-page that includes the page (selected in step 500) is marked as non-allocatable. More specifically, each page that is part of the same m-page as the page (specified in the physical address in 602) is marked as non-allocatable.

In step 618, a determination is made about whether to proactively correct the data. If the data is ECC correctable, the determination may be made in accordance with Step 510 described above. If the data is not ECC correctable, then the determination about whether to proactively correct may be made in accordance with step 512. If a determination is made to proactively correct the data, the process proceeds to step 620; otherwise, the process ends. In step 620, the page(s) is scheduled for garbage collection in accordance with the discussion above in step 514.

FIGS. 7A-7D show examples in accordance with one or more embodiments of the invention. The following examples are not intended to limit the scope of the invention.

Figure 7A:
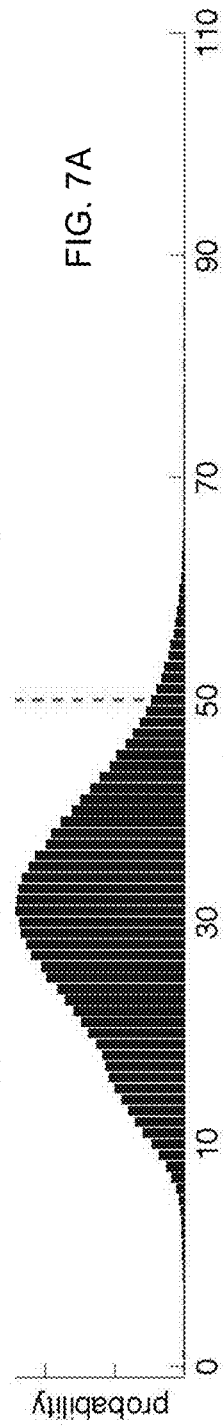
FIGS. 7A-D show examples in accordance with one or more embodiments of the invention.
Figure 7B:
Figure 7C:
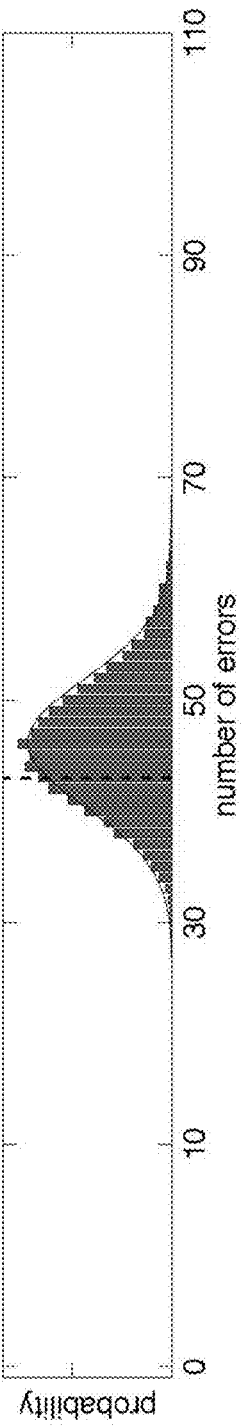

With respect to FIGS. 7A-7C, FIGS. 7A-7C illustrate one embodiment for determining a BEV threshold for retention time t-1 with a P/E cycle value of p, where the goal is to limit use of RAID to correct corrupted data to less than 1% of data read at retention time t. FIG. 7A shows the distribution of BEVs for pages at retention time t. Without implementing embodiments of the invention, 3.25% of the read requests would require the use of a RAID scheme to reconstruct corrupted data (i.e., 3.25% of pages have BEV greater than 50 bit errors, which is maximum number of bit errors that may be corrected using ECC in this example).

FIG. 7B shows the distribution of BEVs for the same pages at retention time t-1. FIG. 7C shows the distribution of BEVs at retention time t-1 for pages were corrupted at retention time t (i.e., pages that had BEVs greater than 50 at retention time t). The pages shown in FIG. 7C are sequentially removed (starting with highest BEVs along with the related pages that are part of the corresponding m-pages) until the number of pages at retention time t that have BEVs greater than 50 correspond to less than 1% of all pages. In this example, the number of pages that are removed corresponds to pages that have a BEV greater than 43 at retention time t-1. In this example, the percentage of removed pages at time t is 7.69% (i.e., 7.69% of the pages in the persistent storage are non-allocatable).

Figure 7D:
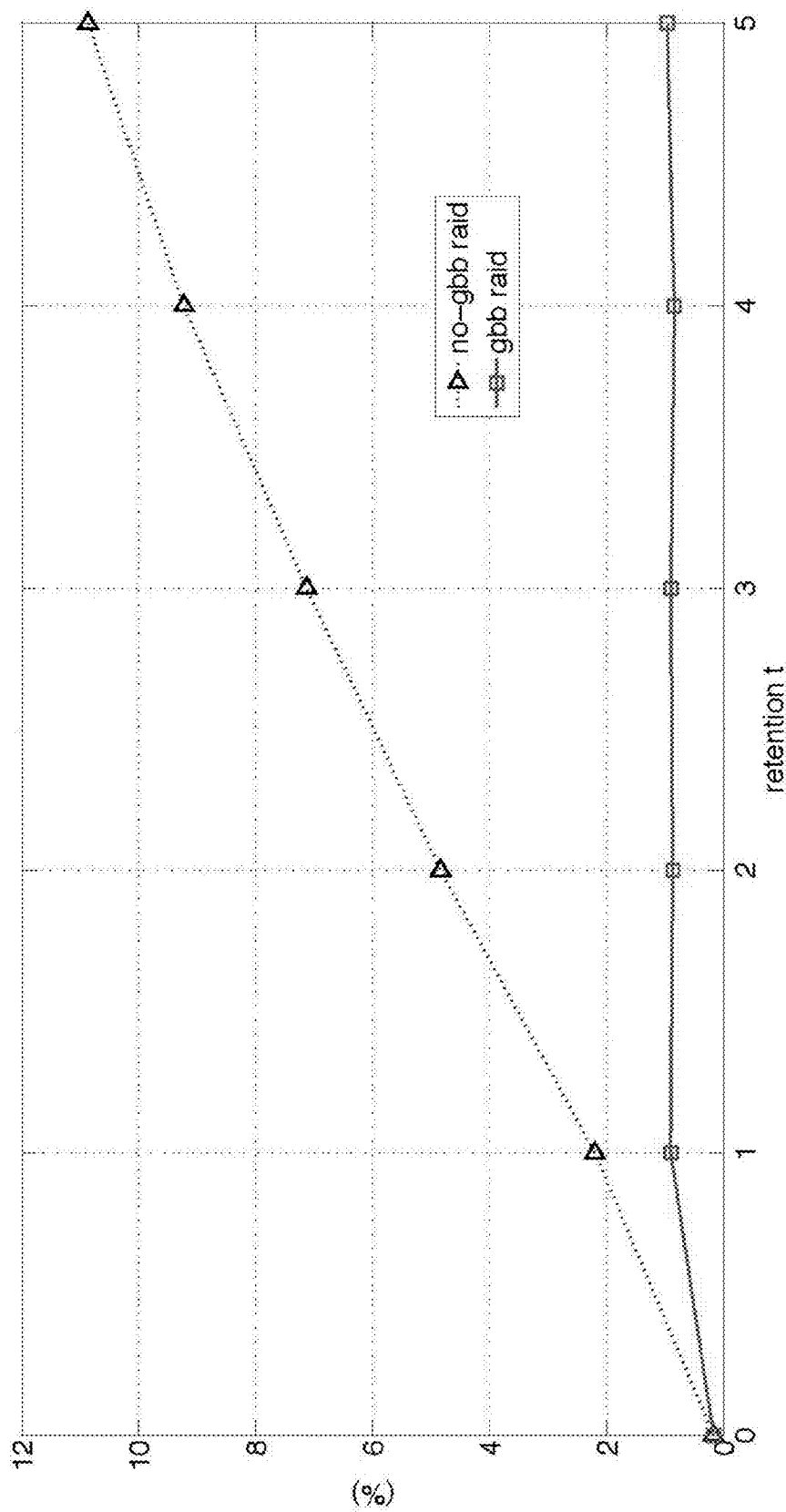

Referring to FIG. 7D, FIG. 7D shows hypothetical performance benefits of implementing one or more embodiments of the invention. Specifically, for P/E cycle values of p and requirement that RAID is invoked for no more than 1% of read requests, embodiments of the invention invoke RAID for no more than 1% of read requests while storage appliances that do not implement embodiments of the invention invoke RAID on greater than 10% of read requests at retention time increment 5. Said another way, RAID is invoked 10 times more often in storage appliances that do not implement embodiments of the invention, thereby resulting a high read latency for such storage appliances, as compared with storage appliances with implement one or more embodiments of the invention.

One or more embodiments of the invention may be implemented using instructions executed by one or more processors in the system. Further, such instructions may corresponds to computer readable instructions that are stored on one or more non-transitory computer readable mediums.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing persistent storage, the method comprising:
   selecting a page for a proactive read request, wherein the page is located in the persistent storage;
   issuing the proactive read request to the page;
   receiving, in response to the proactive read request, a bit error value (BEV) for data stored on the page;
   obtaining a BEV threshold (T) for the page, wherein T is determined using a program/erase (P/E) cycle value associated with the page and a retention time of the data stored on the page, wherein obtaining T comprises performing a look-up in an in-memory data structure in memory, wherein the memory is located in a control module operatively connected to the persistent storage, wherein the in-memory data structure comprises a birth time for all data stored in the persistent storage and a plurality of entries, wherein each of the plurality of entries comprises one of a plurality of Ts, one of a plurality of P/E cycle values, and one of a plurality of retention times;

making a first determination that the BEV is greater than T;

based on the first determination:
identifying an m-page, wherein the m-page is a set of pages, wherein the page is in the set of pages;
setting the m-page as non-allocatable for future operations.

2. The method of claim 1, further comprising:
making a second determination that the data on the page is correctable using error-correcting codes;
based on the second determination:
scheduling the data on the page to be written to a new allocatable page in the persistent storage.

3. The method of claim 2, further comprising:
after the scheduling:
writing the data on the page to the new allocatable page as part of a garbage collection operation.

4. The method of claim 1, further comprising:
making a second determination that the data on the page is not correctable using error-correcting codes;
based on the second determination, making a third determination to proactively correct the data on the page using a RAID correction mechanism.

5. The method of claim 4, wherein the third determination takes into account a BEV of at least one other page in the persistent storage, wherein the page and the at least one other page are part of a RAID stripe.

6. The method of claim 1, wherein future operations comprise at least one selected from a group consisting of a write operation and a garbage collection operation.

7. The method of claim 1, wherein the BEV specifies a percentage of bits in the page that are incorrect.

8. The method of claim 1, wherein the BEV specifies a number of bits in the page that are incorrect.

9. The method of claim 1, wherein the BEV is determined using error-correcting codes.

10. The method of claim 1, wherein the page is located on a solid-state memory module in the persistent storage, wherein the solid-state memory module comprises a multi-level cell (MLC).

11. The method of claim 1, wherein the retention time is determined using a first time that the data was written to the page and a second time associated with the proactive read request.

12. The method of claim 1, wherein the P/E cycle value is a P/E cycle value range.

13. A system, comprising:
a storage module comprising a storage module controller and persistent storage; and
a control module operatively connected to the storage module and a client,
wherein control module comprises memory, wherein the memory comprises an in-memory data structure comprising a birth time for all data stored in the persistent storage and a plurality of entries, wherein each of the plurality of entries comprises one of a plurality of bit error value (BEV) thresholds (Ts), one of a plurality of P/E cycle values, and one of a plurality of retention times, and
wherein the retention time for the data stored on the page is determined using a birth time for the data stored on the page from the memory,
wherein the control module performs the following steps:
selecting a page for a proactive read request, wherein the page is located in the persistent storage;
issuing the proactive read request to the page;
obtaining, in response to the proactive read request, a BEV for data stored on the page;
obtaining a T for the page, wherein T is determined using a program/erase cycle value associated with the page and a retention time of the data stored on the page, wherein obtaining T comprises performing a look-up in the in-memory data structure;
making a first determination that the BEV is greater than T;
based on the first determination:
identifying an m-page, wherein the m-page is a set of pages, wherein the page is in the set of pages; and
setting the m-page as non-allocatable for future operations.

14. The system of claim 13, wherein the persistent storage comprises flash memory and wherein the page is located in the flash memory.

15. The system of claim 13, wherein the control module further performs the following steps:
making a second determination that the data on the page is correctable using error-correcting codes;
based on the second determination:
scheduling the data on the page to be written to a new allocatable page in the persistent storage;
after the scheduling, writing the data on the page to the new allocatable page as part of a garbage collection operation.

16. The system of claim 13, wherein the control module further performs the following steps:
making a second determination that the data on the page is not correctable using error-correcting codes;
based on the second determination, making a third determination to proactively correct the data on the page using a RAID correction mechanism.

17. The system of claim 16, wherein the third determination takes into account a BEV of at least one other page in the persistent storage, wherein the page and the at least one other page are part of a RAID stripe.

18. A non-transitory computer readable medium comprising computer readable program code, which when executed by a computer processor enables the computer processor to:
select a page for a proactive read request, wherein the page is located in the persistent storage;
issue the proactive read request to the page;
receive, in response to the proactive read request, a bit error value (BEV) for data stored on the page;
obtain a BEV threshold (T) for the page, wherein T is determined using a program/erase (P/E) cycle value associated with the page and a retention time of the data stored on the page, wherein obtaining T comprises performing a look-up in an in-memory data structure in memory, wherein the memory is located in a control module operatively connected to the persistent storage, wherein the in-memory data structure comprises a birth time for all data stored in the persistent storage and a plurality of entries, wherein each of the plurality of entries comprises one of a plurality of Ts, one of a plurality of P/E cycle values, and one of a plurality of retention times;
make a first determination that the BEV is greater than T;

based on the first determination:
    identify an m-page, wherein the m-page is a set of pages, wherein the page is in the set of pages; and
    set the m-page as non-allocatable for future operations.

* * * * *